United States Patent [19]

Franks, Jr.

[11] Patent Number: 5,006,074
[45] Date of Patent: Apr. 9, 1991

[54] ADJUSTABLE GROUND CLAMP

[76] Inventor: George J. Franks, Jr., 664 Thompson Cir., Inverness, Ill. 60067

[21] Appl. No.: 320,360

[22] Filed: Mar. 8, 1989

Related U.S. Application Data

[63] Continuation-in-part of Ser. No. 204,397, Jun. 9, 1988, which is a continuation-in-part of Ser. No. 116,899, Nov. 3, 1987, Pat. No. 4,828,504.

[51] Int. Cl.$^5$ ............................................. H01R 4/66
[52] U.S. Cl. ..................................... 439/92; 439/433; 439/803
[58] Field of Search ........................ 439/92, 433–435, 439/803, 813

[56] References Cited

U.S. PATENT DOCUMENTS

| | | | |
|---|---|---|---|
| 2,260,136 | 10/1941 | Bergan | 174/51 |
| 2,420,895 | 5/1947 | Merriman | 173/273 L |
| 2,632,068 | 3/1953 | Froebel et al. | 200/51.07 |
| 3,363,219 | 1/1968 | Hubbard et al. | 339/95 |
| 4,476,759 | 10/1984 | Aderneck | 83/574 |
| 4,538,879 | 9/1985 | Wagener | 339/22 B |
| 4,626,051 | 12/1986 | Franks, Jr. | 339/14 |
| 4,776,808 | 10/1988 | Davidson | 439/100 |
| 4,904,193 | 2/1990 | Graves | 439/92 |

FOREIGN PATENT DOCUMENTS 1132999  7/1962  Fed. Rep. of Germany .
1126748  7/1956  France .
2195837  4/1988  United Kingdom .

Primary Examiner—Eugene F. Desmond
Attorney, Agent, or Firm—Jenner & Block

[57] ABSTRACT

An adjustable clamping device provides a means for grounding a hollow metal box which can be of various dimensions. A C-shaped clamping device includes two separate, elongated members, and a threaded bolt and tab to secure the two members together. One of the members has a plurality of holes to receive the bolt and the tab, and the other member has a threaded hole formed therein to receive the bolt. The alignment of each of the plurality of holes with the threaded hole and tab of the other member establishes a plurality of different, discrete lengths for the base. The base has an end arm which carries a threaded grounding bolt movable into contact with the box. The grounding bolt has an abrading end surface which penetrates the outer surface of the box to form an intimate electrical contact with the base metal for grounding purposes.

21 Claims, 3 Drawing Sheets

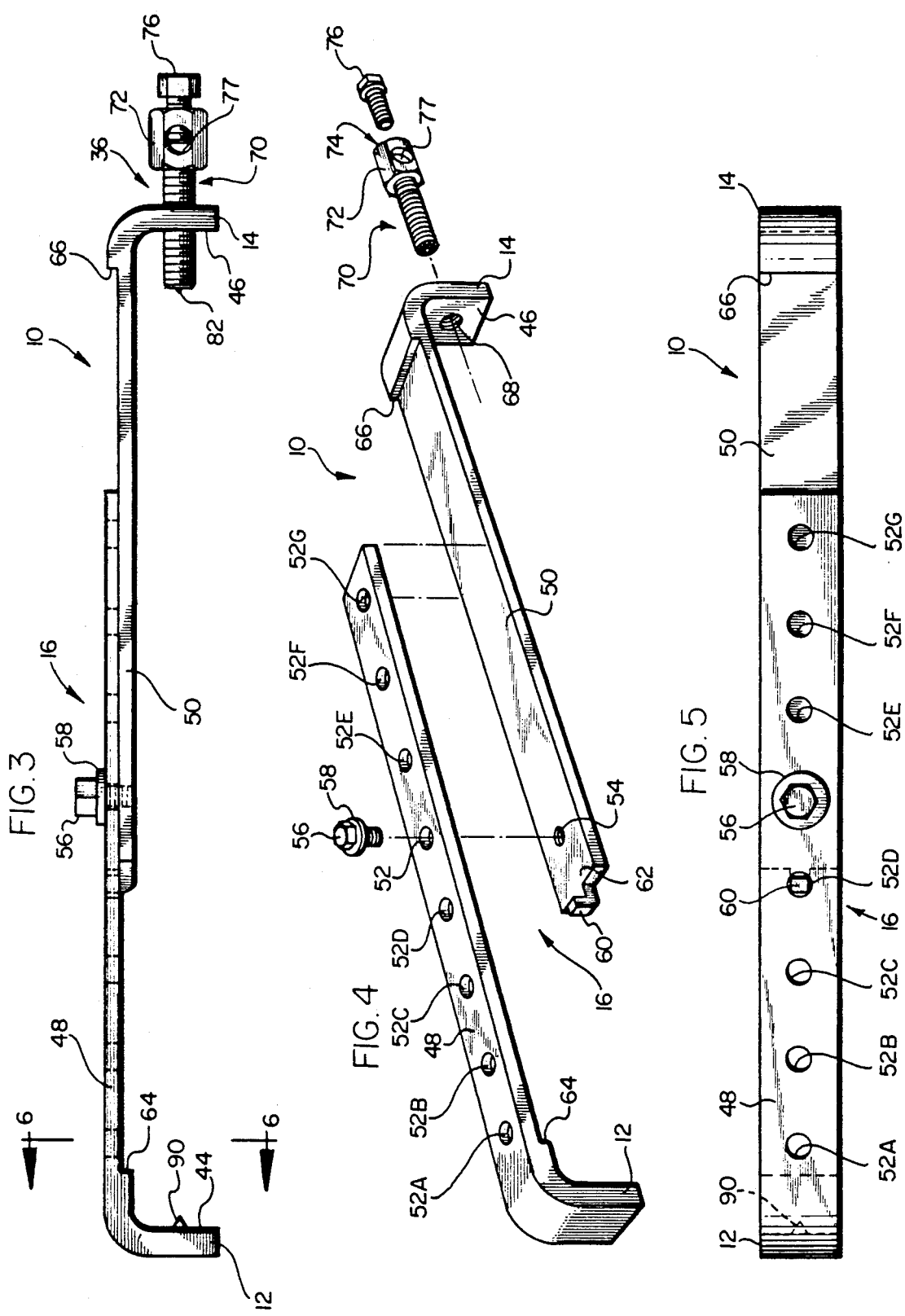

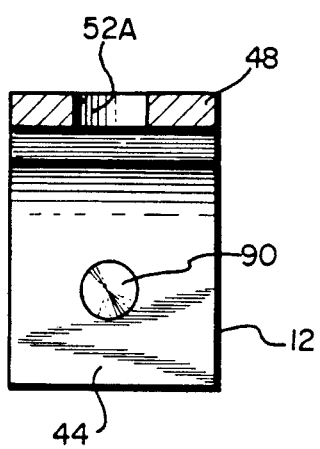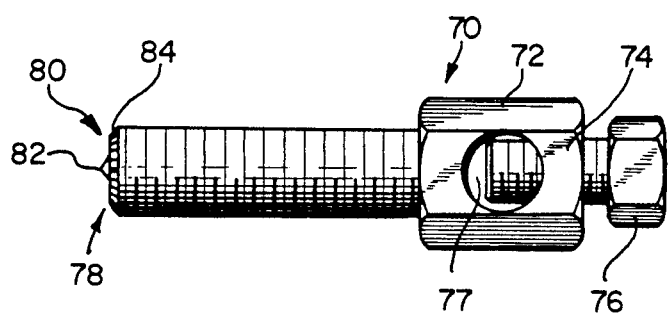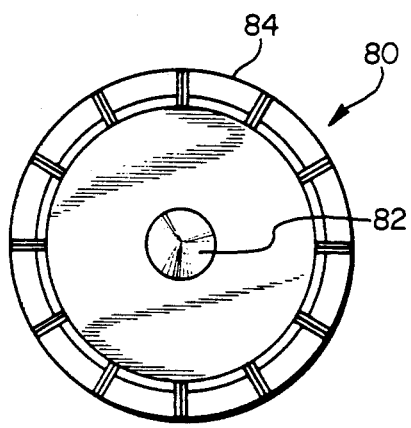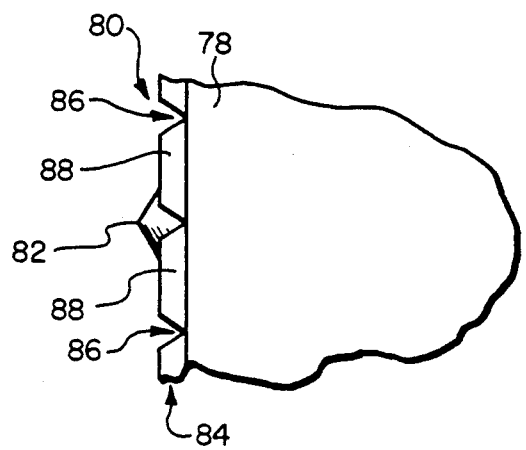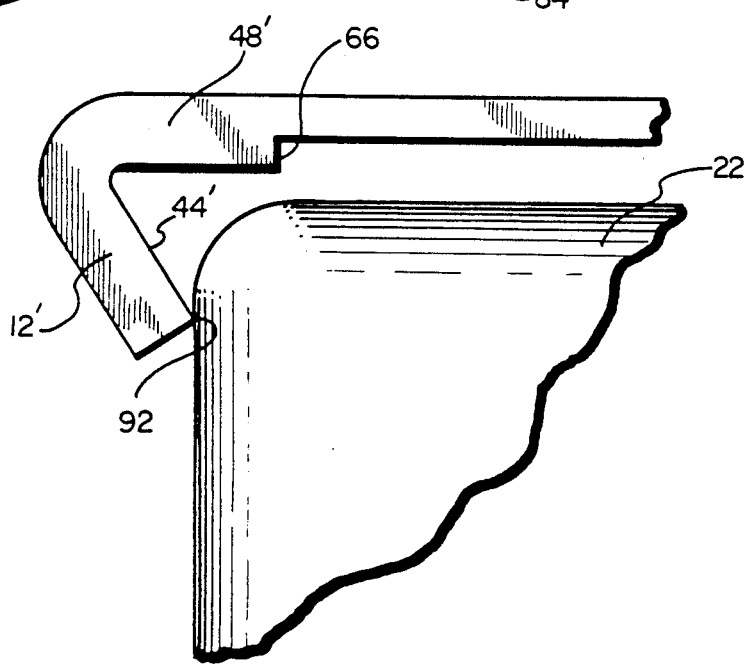

ADJUSTABLE GROUND CLAMP

This is a continuation-in-part of application Ser. No. 204,397, filed June 9, 1988, which is in turn a continuation-in-part of application Ser. No. 116,899, filed Nov. 3, 1987, now U.S. Pat. No. 4,828,504.

FIELD OF THE INVENTION

The present invention relates to an adjustable grounding clamp for mechanical and electrical connection to conductors of varying lengths, such as a hollow metal box. The length of the ground clamp is adjustable to accommodate placement of the clamp on a conductor having a width within a predetermined range.

BACKGROUND OF THE INVENTION

Various clamping devices are known in the art for providing an electrical connection to a conductor. These include C-clamps and various forms of strap connectors.

These known clamping devices typically have first and second arms that extend at a fixed distance from each other from a base. The arms and base form a C- or U-shape with the arms being positioned adjacent the sides of the conductor. The base can be positioned against or slightly above a surface of the conductor. The clamp can be attached to the conductor through one or more mechanisms, such as an elongated screw, once the clamp is placed on the conductor.

The first and second arms are rigidly fixed on the base with the distance between the arms consequently also being fixed As a result, these clamps can only be used for conductors of a predetermined limited range of widths, generally equal to the length of the adjustable screw. If the conductor has a width outside this limited range of widths, the clamp is simply not attachable to the conductor and would fall off.

Since conductors are not of a standard shape and vary in width, a clamp that is adjustable to the width of the conductor is desirable. This is particularly the case when the conductor is a hollow metal box, such as a utility box for electrical power service to a building. Where the conductor is to be used in an outdoor environment, it is typically painted and/or treated with a coating to prevent rusting and to provide for a longer life. Also, dirt, corrosion and other non-conducting material may be deposited on or associated with the box, all of which must be penetrated by the clamp.

When used for purposes of an electrical grounding system, the clamp must be capable of conducting high amperage current to ground, as might occur in a lightning strike, without premature failure. For example, one standard test requirement in the telephone industry for a ground clamp which is intended to conduct a lightning strike to a ground rod is known as a "fusion current test." A length of No. 6 AWG solid copper wire is connected to the ground clamp, and 1,000 amperes electrical current is applied for a minimum of 20 seconds. To be acceptable, there must be no damage to the ground clamp and associated structure for the 20-second duration or until the No. 6 AWG solid copper wire fuses. The wire is not allowed to fuse within one inch of the clamp. Other current tests are known in other industries or standard setting or testing bodies, which involve passing sizable amounts of current through a solid copper conductor to the ground clamp for various time durations without damage to the clamp or the outlet box or conductor to which it is attached.

It has been known to propose a ground clamp having teeth resting against a hollow electrical utility box for grounding purposes. The spacing between the teeth is adjustable by a screw having break-off positions. However, such a mechanism is not capable of penetrating paint and other non-conductive surfaces which coat an electrical utility box in a manner to form an intimate ground connection, i.e., a ground connection sufficient to pass a fusion current test so that the ground clamp can be utilized for its intended purpose. Thus, there has been great need for an adjustable ground clamp which can span hollow utility boxes of various manufacturers and of various widths, and which form an intimate electrical contact for grounding purposes.

SUMMARY OF THE INVENTION

In accordance with the present invention, an adjustable ground clamp is provided which is adjustable through a substantial range of widths and provides an intimate grounding contact which can adequately penetrate an outer surface of paint and other non-conducting materials. The clamping device comprises an elongated C-shaped clamp with arms extending from an elongated base which is adjustable throughout a substantial range of lengths. Associated with one of the arms is a stud or screw having an abrading end which penetrates paint and other non-conducting coatings in order to form an intimate contact with a conductor, such as a hollow metal utility box. This intimate contact is adequate to ground the utility box and sufficient to carry a substantial amount of current.

The length of the base is adjustable to any one of a plurality of discrete, predetermined lengths. The base comprises two separate, elongated members, and a threaded bolt to secure the two members together. Each member has a hole to receive the bolt, with at least one of the holes being threaded.

In a particular embodiment, one of the separate, elongated members has a plurality of holes throughout its length. The other of the elongated members has an aligning hole, which may be threaded, and a tab upstanding therefrom for insertion into the plurality of holes on the other elongated member. By aligning the tab in different ones of the plurality of holes, and securing a screw through another hole into the aligning hole for clamping together the members, the base is adjustable for a plurality of discrete, predetermined lengths. Preferably, the distance between the plurality of holes is on the same order of length as the clamping bolt which is carried on an arm of one member. The combination of the length of the bolt for abrading the outer surface of the conductor, and the plurality of discrete holes, form a continuous range of adjustments.

Securing means for penetrating the outer surface of the conductor without penetrating the inside of the conductor are included. The securing device for the clamp includes a serrated end surface which will abut and abrade the surface of the conductor and additionally includes a projecting point which prevents the clamp from moving or "walking" off the surface of the utility box as the system is secured to the box. At the opposite end of the clamping device, another projecting point or other mechanism is used to similarly prevent inadvertent movement or "walking" of the device as it is being secured.

The simplicity of the device and its ease of attachment provide for an effective clamp that can be connected to conductors, such as hollow metal boxes, of varying widths by persons having no special training and without the need for special tools.

One object of this invention is to provide an adjustable clamping device connectable to a hollow box and having a securing clamp which forms an adequate electrical and mechanical connection without penetrating through the hollow box and compromising its integrity.

Other objects and advantages of the invention will become apparent upon the following detailed description with reference to the drawings, like reference numerals refer to like parts.

BRIEF DESCRIPTION OF THE DRAWINGS

FIG. 3 is an enlarged front plan view of the clamp shown in FIG. 1;

FIG. 4 is an exploded perspective view of the clamp shown in FIG. 3;

FIG. 5 is a top view of the clamp shown in FIG. 3;

FIG. 6 is a sectional view of the clamp illustrated in FIG. 3 taken along lines 6—6;

FIG. 7 is an enlarged front plan view of the threaded bolt illustrated in FIG. 3;

FIG. 8 is an enlarged view of the end portion of the threaded bolt of FIG. 7;

FIG. 9 is an enlarged view of a portion of the leading or cutting structure formed on the end of the threaded bolt; and FIG. 10 is a partial side view of another embodiment for the first side portion of the clamp shown in FIG. 3.

DESCRIPTION OF THE PREFERRED EMBODIMENTS

Figure 1:
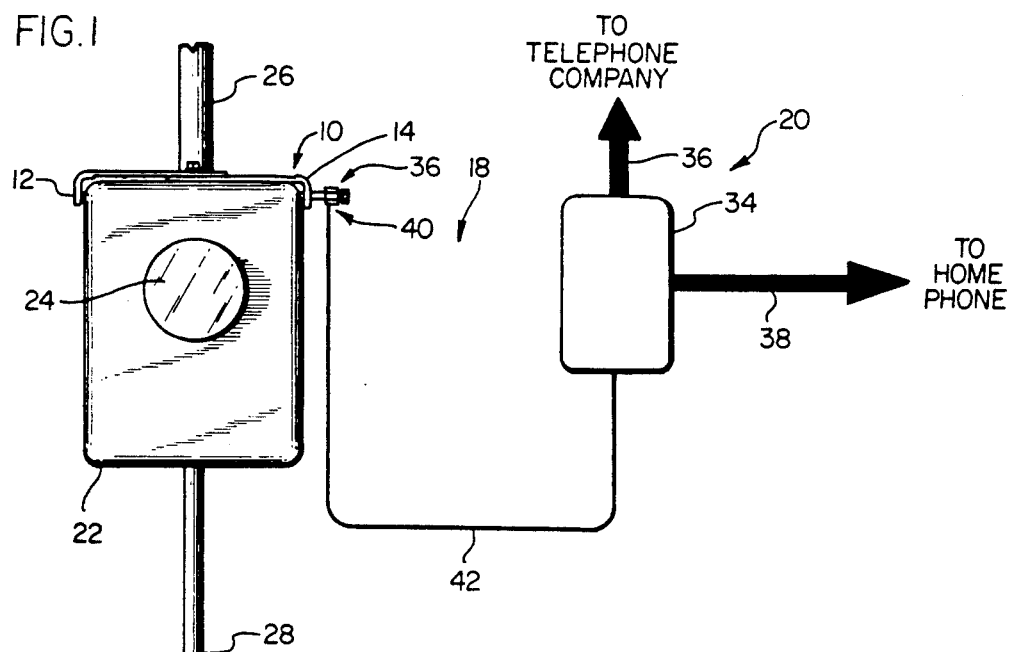
FIG. 1 is a front plan view of a grounding system including the use of one embodiment of the invention.

A novel ground clamp 10 which is utilized for connection to conductors of varying widths is generally shown in FIGS. 1-10. The clamp 10 has a first side or arm portion 12 and a second side or arm portion 14 attached to a base 16. Base 16 is adjustable to a plurality of different lengths to position first arm 12 and second arm 14 closely adjacent respective sides of the conductor.

For illustrative purposes, the clamp 10 will be described as used in a grounding system 18 for a telephone interface system 20. A ground connection is to be provided between the telephone interface system 20 and an electrical utility box 22 through clamp 10. While the system is illustrated in connection with an utility box 22, it will be apparent that the novel clamp 10 can be used anytime an electrical and mechanical connection is to be made to a conductor such as a hollow metal box enclosure. The system has particular utility to form an electrical ground to a conductor which is painted or otherwise coated with a non-conducting layer. An intimate electrical connection must be formed to the box. Such a box may have a wide range of physical dimensions. It may be coated with dirt and may be found in a variety of conditions due to an adverse outdoor environment.

Electrical power and telephone service are typically connected through overhead risers or buried underground cables to interface equipment located on the outside of a building. FIG. 1 illustrates some of the interface equipment mounted to a side of a building including an utility box 22 of rectangular shape which mounts a power meter 24 for determining the amount of electrical power consumption being utilized within the building. A hollow conduit or riser 26 extends upwardly in the case of overhead service, or alternatively, the box may be an elongated structure extending downwardly (not illustrated) and partially buried into the ground through which the power cables would be led from an underground feeder system.

Whether the utility box has an overhead feed or an underground feed, the box 22 itself must be electrically connected to ground G through a suitable grounding system. The box 22 is hollow and houses the interconnection equipment for the electrical power system. The outside of the box 22 is painted or otherwise has a non-conducting layer to withstanding the outdoor environment and to inhibit corrosion. A hollow conduit 28 holds a large size grounding wire 30 which electrically connects the box 22 to an elongated grounding rod 32 sunk into the ground G. Typically, this grounding rod 32 may be six feet or more in length and is located within three feet or other close proximity to the base of the building. Ground wire 30 is connected to a grounding bracket (not illustrated) within the electric utility box 22 in a known manner.

Located closely adjacent the electric utility box 22 will be a telephone interface box 34 which is mounted to the wall of the building. Telephone interface box 34 is connected through an overhead riser 36 or underground feed to the external telephone company system. The telephone lines are connected through interface box 34 to the building phone system through conventional wiring 38. Interface box 34 must also be grounded suitably to the same ground G in a manner which will not cause a potential difference between the telephone system and the electrical power system in the event that lightning or accidental electrical contact should be made to the telephone wires themselves.

Clamp 10 has an elongated base 16 longer than one of the sides of the box 22. The first arm 12 and the second arm 14 extend from the ends of base 16 and are positioned closely adjacent opposite sides of box 22 to engage and clamp the box 22 therebetween. Clamp 10 includes securing means for penetrating the outer surface (including paint and other non-conducting layers) of utility box 22 so as to form an intimate electrical connection to the base metal of the box, without penetrating the inside of the hollow utility box 22. Clamp 10 further includes a ground wire securing mechanism 40 in the form of a further clamping device for securing a ground wire 42 to the clamp and through the ground wire 42 to the telephone interface box 34. Ground wire 42 is typically AWG size 6 through 12, inclusive. Clamp 10 provides a mechanical connection to utility box 22, and also the necessary electrical connection for grounding the telephone system to utility box 22 which in turn is grounded through ground wire 30 to the ground rod 32.

Figure 2:
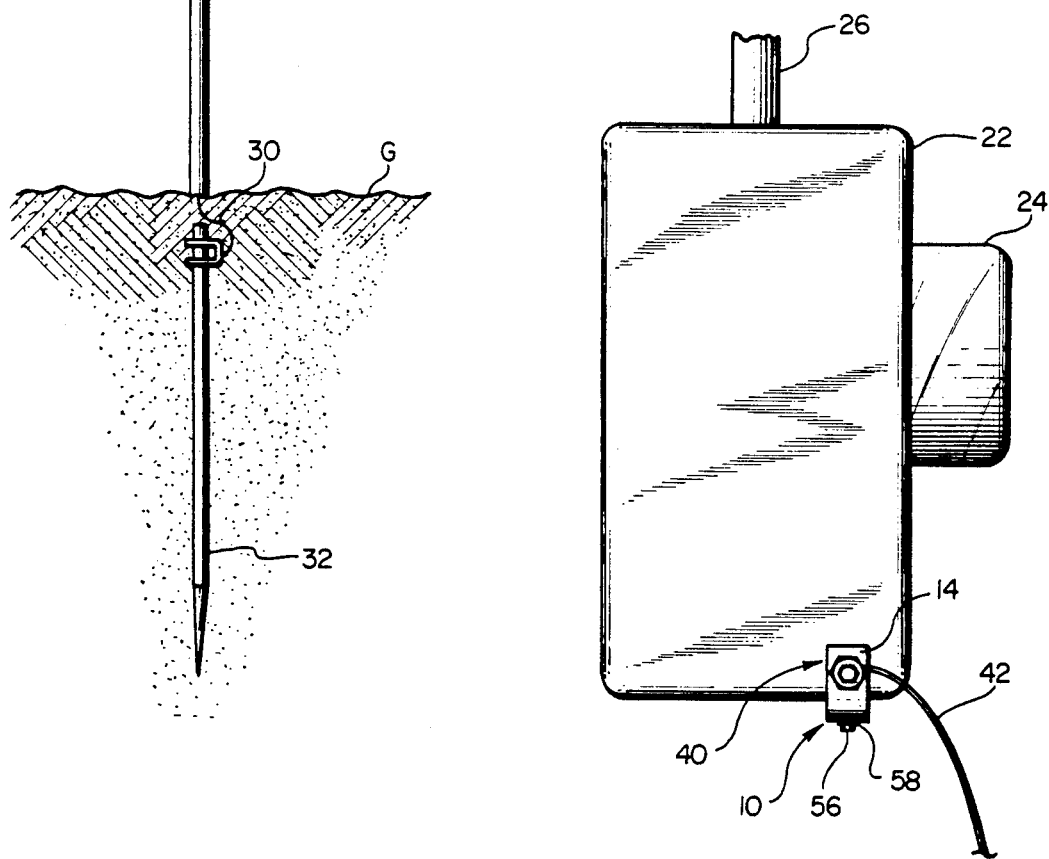
FIG. 2 is an elevated partial side view of the embodiment of the invention in FIG. 1, illustrating an alternate placement of the clamp.

Thus, a single grounding system is provided for both the telephone interface equipment and the electrical utility system for a building. Such a single grounding system, and a non-adjustable clamp for use therewith, is described in my earlier parent patent application entitled "Ground System And Clamp" Ser. No. 204,397, filed June 9, 1988, the disclosure of which is hereby incorporated by reference in this application. While the clamp 10 is illustrated as located on top of the utility box 22 in FIG. 1, alternate placements are possible, such as on the bottom of the box as illustrated in FIG. 2.

The mechanism by which the ground clamp 10 is adjustable through a substantial range of widths is best illustrated in the remaining drawings. As seen in FIG. 3, first and second arms 12 and 14 are generally of the same shape and substantially parallel to each other. First and second side portions 12 and 14 have first and second inner surfaces 44 and 46, respectively. First and second inner surfaces 44 and 46 also substantially oppose each other. In an alternate embodiment illustrated in FIG. 10, however, a first side portion 12' may form an angle less than 90 degrees and approaching 45 degrees relative to base 16. First side portion 12' is thus inclined towards second side portion 14.

As seen in FIGS. 3-5, the base 16 is made of two separate, elongated members 48 and 50 which are secured to each other. First side portion 12 extends from first elongated member 48 and second side portion 14 extends from second elongated member 50. First and second elongated members 48 and 50 have holes 52 and 54, respectively, for use in securing the elongated members 48 and 50 together.

Hole 54 is threaded to receive a bolt 56 therein. When holes 52 and 54 are aligned, bolt 56 passes through hole 52 and is tightened into threaded alignment hole 54. A washer 58 is placed on bolt 56 (or may be integral therewith) before it is used to secure elongated members 48 and 50. As illustrated in FIG. 3, bolt 56 has a length which is approximately equal to or slightly less than the combined thickness of elongated members 48 and 50. If the length of bolt 56 was larger than the combined thickness, a portion of bolt 56 would protrude out of hole 54 upon tightening. This protrusion would prevent the clamp 10 from lying flat against box 22.

Although bolt 56 is illustrated as securing first and second elongated members 48 and 50, other releasable securing means, such as clips and the like, may be used. Further, while elongated member 48 is illustrated as being secured on top of elongated member 50, the reverse is also possible. Alternatively, holes 52 and 54 may both be threaded.

The length of base 16 can be varied within a predetermined range of lengths so that clamp 10 can be secured to boxes 22 with widths falling within a wide range of lengths. Specifically, first elongated member 48 has a plurality of holes 52A-G, in addition to hole 52. Holes 52A-G and 52 are formed all along the same linear path and are all capable of receiving bolt 56 therethrough. When any one of the holes 52A-G and 52 are aligned with hole 54 and bolt 56 is received in the aligned hole to secure first and second elongated members 48 and 50 together, a different discrete length for base 16 is formed. Holes 52 and 52A-G are spaced apart at predetermined increments to create a plurality of discrete, predetermined lengths. For example, holes 52 and 52A-G may be spaced at one-half inch intervals from each other so that base 16 can be adjusted at one-half inch increments. As will appear, a securing bolt 36 which forms the intimate electrical and mechanical contact with the box, has a length of slightly greater than one-half inch and is continuously adjustable within this range. As will therefore be apparent, a continuous range of adjustments is formed throughout the discrete range of adjustments formed by aligning the hole 54 with different ones of the holes in the elongated member 48.

An upright tab 60 is formed at the end portion 62 of first elongated member 50. As illustrated in FIGS. 3-5, tab 60 is positioned on elongated member 50 so that upon the clamping together of the elongated members by screw 56, the tab 60 snugly fits within a hole 52 or 52A-G. Tab 60 in conjunction with the screw 56 keeps first and second elongated members 48 and 50 in linear alignment with each other. Depending upon manufacturing tolerances, the tab 60 may have a slight play or adjustment within one of the holes 52, 52A-G, which allows the pair of elongated members 48 and 50 to skew slightly or become scissored slightly with respect to each other. A slight skew is generally not a problem, because upon tightening of the securing bolt 36, the pair of elongated members 48 and 50 will generally jam tightly against each other as the securing bolt 36 is tightened against the utility box.

The use of fixed tab 60 allows the clamp to be manufactured with a minimum of parts and very economically. However, alternative constructions are possible, such as extending the length of elongated base 50 and forming another threaded hole therein, and using a second threaded bolt like screw 56 to be inserted through a differently one of the holes 52A-G and into alignment with the second hole on elongated member 50. Alternate arrangements are possible so long as two spaced securing means as formed between the elongated base members to thereby keep the members in alignment once interconnected.

Elongated base 48 has on its bottom side a step or ridge 64 so that the thickness of the base 48 is reduced throughout most of its length. Conversely, elongated base 50 has a step or ridge 66 between the thickness of the end member 14 and the remaining length of the base. When the base members are interconnected to form their minimum width, the end of the base member 48 abuts the ridge 66 on base member 50, and the thickness of the two elongated base members 48, 50 is approximately equal to the thickness of the end members 12 and 14. The thickness of each of the base members 48, 50 along their reduced thickness portions must be sufficient so that the base members are rigid, solid members which do not bow or bend when interconnected, as such movement might cause the securing screw 36 to slowly work loose after being tightened against the box.

The securing device 36, seen best in FIGS. 3, 4 and 6-9, forms an adjustable abrading surface which penetrates paint and other non-conducting surfaces of the box in a manner to form an intimate electrical contact with the box sufficient to pass substantial amperage current in order to be used in a earth grounding system. More particularly, a threaded opening 68, see FIG. 4, is formed through second side portion 14. A threaded stud or bolt 70 is moveable therein. Bolt 70 is fine threaded to permit a greater amount of rotational or turning motion against utility box 22. Bolt 70 is formed of a electrically conducting metal material, such as a heat-treated beryllium copper alloy.

Preferably, bolt 70 has a length such that clamp 10 can be secured to box 22 intermediate of and spanning the discrete lengths of base 16 determined when hole 54 is aligned with any one of holes 52 and 52A-G. For example, the length of the bolt 70 is such that the interior portion between the arm 14 and the box is at least one-half inch when the distance between the plurality of holes 52, 52A-G is one-half inch. This allows a continuous range of adjustments by selecting a desired discrete distance by interconnecting the appropriate hole and tab 60, and then making the final range of adjustment by the threaded bolt 70.

As illustrated in FIGS. 3–5 and 7, a hexagonally-shaped head 72 is formed on bolt 70. A bore 74, preferably coaxial with opening 68, is formed through head 72. This bore 74 is threaded to accommodate ground wire securing screw 76. Securing screw 76 functions to secure ground wire 28 (see FIG. 1) to bolt 70 in bore 77 to establish a mechanical and electrical connection therebetween.

The terminal or free end 78 of bolt 70 has a special end surface 80. A center point 82 extends outwardly from end surface 80. Center point 82 is generally cone-shaped. Preferably, as illustrated in FIG. 9, center point 82 extends for a relatively short length past end surface 80. Center point 82 is used to prevent inadvertent movement or "walking" of the clamp 10 as it is being secured.

The edge of end surface 80, best illustrated in FIGS. 7–9, is formed with an abrading annular surface 84 comprising grooves 86 and ridges 88. Depending on the hardness of the material to which the clamp 10 is to be applied, however, conventional machining techniques used in the fabrication of bolts may provide an abrading surface of sufficient roughness to grind through the coating material of the box and into intimate electrical contact with the base conducting metal of the box. Likewise, other penetrating end surfaces are usable including scoring or cutting. Alternatively, a knife-like edge (not shown) may be provided.

As head 72 of bolt 70 is turned to secure clamp 10 to utility box 22, center point 82 contacts utility box 22 before the abrading surface 84 and first begins to penetrate the outside surface of utility box 22. As bolt 70 is rotated, the abrading surface 84 rotates into engagement to penetrate the outer surface of utility box 22. Abrading surface 84 mechanically scrapes the paint or other coating covering the box, and also penetrates dirt and/or corrosion from the outside surface of utility box 22, to thereby form a sufficient electrical connection. The center point 82, which first penetrates the box, holds the bolt 70 against inadvertent movement or "walking" as abrading surface 84 is grinding or digging into the surface of the box.

Mechanisms for preventing inadvertent movement or "walking" of first side portion 12 are also provided as illustrated in FIGS. 3–5 and 6. In FIGS. 3, 5 and 6, a second, cone-shaped point 90 is formed on inner surface 44 which extends outwardly towards second side portion 14. First side portion 12, as shown, is substantially parallel to second side portion 14. The center line of opening 68 is preferably coaxial with the center line of second point 90.

Second point 90 is preferably formed of a material with a hardness greater than the hardness of the material to which clamp 10 is being secured. For this purpose, the point 90 may be a hardened insert having a cylindrical body which snugly fits into a bore formed through first side portion 12. In such a case, the remainder of the clamp can be formed of a softer material.

As clamp 10 is being tightened to utility box 22, second point 90 penetrates the outer surface of utility box 20, thereby preventing walking. Second point 90 is preferably of a length so that second point 90 can not penetrate into the inside of utility box 22.

Alternatively, as illustrated in FIG. 10, the side portion 12' is inclined at an angle so that the upper, innermost edge 92 will engage the box and dig in sufficiently to prevent walking. Contact edge 92 may comprise a knife edge, or alternatively, a serrated edge. Contact edge 92 functions to prevent inadvertent movement when clamp 10 is being tightened. The manufacturing of clamp 10 is simplified in this embodiment since second point 90 of FIGS. 3, 5 and 6 is eliminated.

While the invention is described in connection with preferred embodiments, it will be understood that it is not intended to limit the invention to these embodiments. On the contrary, it is intended to cover all alternatives, modifications and equivalents as may be included in the spirit and scope of the invention as described by the appended claims.

What is claimed is:

1. An adjustable clamping device for mechanical and electrical connection to the sides of a conductor which may have a variety of different widths, comprising:

a base spanning the conductor, said base having two separate elongated members, each member having an arm extending from one end of the base member positionable adjacent one side of the conductor;

one of the arms including a threaded opening and a threaded bolt moveable therein for engagement with its adjacent side of the conductor, the threaded bolt having an abrading surface for abrading the side of the conductor to penetrate the outer surface thereof; and adjustment means for varying the length of the base within a predetermined range of lengths by securing the members to each other at a plurality of different positions whereby the clamping device is adjustable for different width conductors.

2. The adjustable clamping device of claim 1 wherein the adjustment means establishes a plurality of discrete, predetermined lengths, and means for selecting different ones of the discrete, predetermined lengths in order to correspond with different width conductors.

3. The adjustable clamping device of claim 1 wherein each of the members has a hole for receiving the securing means therein when the holes are aligned with each other.

4. The adjustable clamping device of claim 3 wherein the securing means is a second threaded bolt with at least one of the holes being threaded to receive the second threaded bolt.

5. The adjustable clamping device of claim 3 wherein one of the members has a second hole and the other of the members has a tab formed thereon, with the second hole and the tab being positioned so that upon securing of the members, a portion of the tab rests within the second hole.

6. The adjustable clamping device of claim 3 wherein one of the members has a plurality of holes, each of which is movable in alignment with the hole on the other member to select a different, discrete length for the base.

7. The adjustable clamping device of claim 6 wherein the length of the threaded bolt is greater than the individual discrete adjustment increments selectable for the base to provide a continuous range of adjustments for different width conductors.

8. The adjustable clamping device of claim 1 wherein the end of the threaded bolt includes means for preventing the clamping device from inadvertent movement across the sides of the conductor as the threaded bolt is being tightened.

9. The adjustable clamping device of claim 1 wherein the abrading surface comprises a serrated end surface for abutting and abrading the outer surface of the conductor as the threaded bolt is rotated.

10. The adjustable clamping device of claim 1 including anti-movement means for preventing the clamping device from inadvertent movement across the sides of the conductor as the threaded bolt is being tightened.

11. The adjustable clamping device of claim 10 wherein the anti-movement means comprises a center point on the end of the threaded bolt extending outwardly beyond the abrading end surface.

12. The adjustable clamping device of claim 10 wherein the anti-movement means comprises a point formed on one of the pairs of arms extending to abut the side of the conductor.

13. The adjustable clamping device of claim 1 wherein the arm opposite said threaded bolt bearing arm is generally slanted towards the side of the conductor and includes an abrading edge for engaging and preventing inadvertent movement across the side of the conductor as the threaded bolt is tightened.

14. An adjustable clamping device for mechanical and electrical connection to the sides of a conductor which may have a variety of different widths, comprising:
- a base spanning the conductor and having a pair of arms extending from the ends of the base and positionable adjacent the sides of the conductor;
- one of the arms including a threaded opening and a threaded bolt moveable therein for engagement with its adjacent side of the conductor, the threaded bolt having an abrading surface for abrading the side of the conductor to penetrate the outer surface thereof, the threaded bolt further including a head portion having formed therein a bore for receiving an electrical conductor, a second threaded opening, and a securing screw for securing the electrical conductor within the base to the head portion; and
- adjustment means for varying the length of the base within a predetermined range of lengths whereby the clamping device is adjustable for different width conductors.

15. An adjustable ground clamp for mechanical and electrical connection to the sides of a conductor which is to be grounded, comprising:
- a first elongated base member terminating in an end portion extending at an angle generally less than or equal to 90° from the first elongated base member;
- a second elongated base member overlapping said first base member and terminating in an end portion extending at an angle generally less than or equal to 90° from the second elongated base member;
- adjustment means for interconnecting the overlapped elongated base members at different positions to adjust the distance between the end portions to each be positioned closely adjacent a side of the conductor; and
- ground means mounted on one of the end portions and moveable into engagement with its adjacent side of the conductor for abrading the adjacent side surface to form an intimate electrical ground connection therewith.

16. The adjustable ground clamp of claim 15 wherein the adjustment means includes a hole on each of the first and second base members for receiving an interconnection fastener therein when the holes are aligned with each other.

17. The adjustable ground clamp of claim 16 wherein the interconnection fastener is a threaded bolt and at least one of the holes is threaded to receive the threaded bolt.

18. The adjustable ground clamp of claim 15 wherein one of the base members has a hole formed therein, and the other of the base members has a tab formed thereon and extending into the hole.

19. The adjustable ground clamp of claim 15 wherein the adjustment means comprises a hole on one of the base members and the other base member has a plurality of holes extending along its elongated length, the alignment of each of the plurality of holes with the hole on the one base member determining a different, discrete distance of the end portions from each other.

20. The adjustable ground clamp of claim 19 wherein the ground means comprises a bolt movable within its end portion and having an abrading end surface for abrading the side of the conductor to penetrate the outer surface thereof, the movable length of the bolt being at least equal to the distance between adjacent ones of the plurality of holes.

21. The adjustable ground clamp of claim 15 including means for preventing at least one of the end portions from inadvertent movement across the side of the conductor as the ground means is being secured to the conductor.

* * * * *

UNITED STATES PATENT AND TRADEMARK OFFICE
CERTIFICATE OF CORRECTION

PATENT NO. : 5,006,074
DATED : April 9, 1991
INVENTOR(S) : Geroge J. Franks, Jr.

It is certified that error appears in the above-identified patent and that said Letters Patent is hereby corrected as shown below:

On the title page, please delete
"[63] Continuation-in-part of Ser. No. 204,397, June 9, 1988, which is a continuation-in-part of Ser. No. 116,899, Nov. 3, 1987, Pat. No. 4,828,504."

and insert the following:
[63] Continuation-in-part of Ser. No. 204,397, June 9, 1988, which is a continuation-in-part of Ser. No. 116,899, Nov. 5, 1987, Pat. No. 4,828,504.

Signed and Sealed this

First Day of September, 1992

Attest:

DOUGLAS B. COMER

*Attesting Officer*   *Acting Commissioner of Patents and Trademarks*